US012560130B2

(12) United States Patent
Hanke

(10) Patent No.: US 12,560,130 B2
(45) Date of Patent: Feb. 24, 2026

(54) CYLINDER LINER AND INTERNAL COMBUSTION ENGINE

(71) Applicant: KS Kolbenschmidt GmbH, Neckarsulm (DE)

(72) Inventor: Wolfgang Hanke, Nordheim (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 18/833,031

(22) PCT Filed: Dec. 2, 2022

(86) PCT No.: PCT/EP2022/084278

§ 371 (c)(1),
(2) Date: Jul. 25, 2024

(87) PCT Pub. No.: WO2023/143784

PCT Pub. Date: Aug. 3, 2023

(65) Prior Publication Data

US 2025/0154920 A1 May 15, 2025

(30) Foreign Application Priority Data

Jan. 28, 2022 (DE) ..................... 10 2022 102 054.1

(51) Int. Cl.
*F02F 1/00* (2006.01)

(52) U.S. Cl.
CPC .................................... *F02F 1/004* (2013.01)

(58) Field of Classification Search
CPC ...... F02F 1/004; F02F 1/16; F02F 1/18; F16J 10/04; F16J 10/02
See application file for complete search history.

(56) References Cited

U.S. PATENT DOCUMENTS 10,294,885 B2 * 5/2019 Bettini Rabello ...... F02F 1/004
11,466,777 B2 * 10/2022 Dos Santos Paes ......................... C23C 14/0611
11,536,218 B1 * 12/2022 Batta ......................... F16J 10/04
11,680,537 B2 * 6/2023 Ohira ....................... F02F 1/004 123/668
12,116,951 B2 * 10/2024 Tamaki ...................... F02F 1/20
2016/0053709 A1 * 2/2016 Batta ......................... F16J 10/04 123/193.2
2016/0153392 A1 * 6/2016 Meirelles Tomanik . F16J 10/04 123/668

(Continued)

FOREIGN PATENT DOCUMENTS

CN 204921162 U 12/2015
CN 108747798 A 11/2018

(Continued)

*Primary Examiner* — Grant Moubry

(57) ABSTRACT

A cylinder liner (8) for an internal combustion engine (7), comprising a middle axis (9), and an inner surface (11) running around the middle axis (9). The inner surface (11) comprises a first zone (21), and a second zone (22), which differs from the first zone. The first zone (21) comprises a reduced peak height Rpk of less than 0.2 µm, a core roughness depth Rk of 0.05 to 0.35 µm and a reduced groove depth Rvk of 1.5 to 2.5 µm. The second zone (22) comprises a reduced peak height Rpk of less than 0.2 µm, a core roughness depth Rk of 0.05 to 0.35 µm and a reduced groove depth Rvk of 0.5 to 2.5 µm.

13 Claims, 2 Drawing Sheets

(56) References Cited

U.S. PATENT DOCUMENTS

| | | | | |
|---|---|---|---|---|
| 2016/0356239 | A1* | 12/2016 | Graham .................... | F02F 1/16 |
| 2018/0087468 | A1 | 3/2018 | Lach et al. | |
| 2020/0256277 | A1* | 8/2020 | Kawai ...................... | F16J 10/00 |

FOREIGN PATENT DOCUMENTS

| | | | |
|---|---|---|---|
| CN | 111894756 | A | 11/2020 |
| CN | 212583826 | U | 2/2021 |
| DE | 10 2006 057 111 | A1 | 6/2008 |
| DE | 11 2014 003 421 | T5 | 6/2016 |
| DE | 10 2017 215 335 | B4 | 6/2019 |
| DE | 10 2019 219 378 | A1 | 6/2021 |
| DE | 102021106846 | A1 * | 9/2022 |

* cited by examiner

CYLINDER LINER AND INTERNAL COMBUSTION ENGINE

CROSS-REFERENCE TO RELATED APPLICATION(S)

This application is filed pursuant to 35 U.S.C. § 371 claiming priority benefit to PCT/EP2022/084278 filed Dec. 2, 2022, which claims priority benefit to German Patent Application 102022102054.1 filed Jan. 28, 2022, the contents of both applications incorporated herein by reference in the entirely for all purposes.

TECHNICAL FIELD

The present invention relates to a cylinder liner for an internal combustion engine and an internal combustion engine comprising at least one such cylinder liner.

BACKGROUND

An internal combustion engine comprises an engine block with cylinder bores. Each cylinder bore is assigned a piston, which is coupled to an internal combustion engine crankshaft by means of a connecting rod. In order to improve the tribological properties and thus increase the service life of the pistons, the pistons do not run directly in the cylinder bores during operation of the internal combustion engine, but in so-called cylinder liners.

A cylinder liner is accommodated in each cylinder bore, with a piston running in each cylinder liner. In order to ensure sufficient lubrication of the piston during operation of the internal combustion engine, it can be advantageous to machine an inner surface of the respective cylinder liner using an abrasive process in order to obtain defined roughness parameters on the inner surface.

U.S. Pat. No. 10,294,885 B2 describes a cylinder liner for an internal combustion engine. The cylinder liner comprises an inner surface which is divided into several zones. The zones differ from one another in terms of their roughness parameters.

SUMMARY

Against this background, one task of the present invention is to provide an improved cylinder liner.

Accordingly, a cylinder liner for an internal combustion engine is proposed. The cylinder liner comprises a middle axis and an inner surface running around the middle axis, wherein the inner surface comprises a first zone, which runs around the middle axis, and a second zone, which differs from the first zone and runs around the middle axis, wherein the first zone and the second zone are arranged next to each other when viewed along the middle axis, wherein the first zone comprises a reduced peak height Rpk of less than 0.2 μm, a core roughness depth Rk of 0.05 to 0.35 μm and a reduced groove depth Rvk of 1.5 to 2.5 μm, and wherein the second zone comprises a reduced peak height Rpk of less than 0.2 μm, a core roughness depth Rk of 0.05 to 0.35 μm and a reduced groove depth Rvk of 0.5 to 2.5 μm.

Due to the fact that the first zone and the second zone comprise different roughness parameters, it is possible to design the absorption capacity of the inner surface for a lubricant, in particular for an engine oil, differently in the first zone and in the second zone. This makes it possible to design the inner surface in such a way that a longer service life of the cylinder liner and/or a piston of the internal combustion engine running in the cylinder liner is achieved. The aforementioned specific values of the roughness parameters also have the effect that the service life can be significantly increased.

In particular, the cylinder liner is tubular. In particular, the cylinder liner is rotationally symmetrical to the middle axis. The cylinder liner can be made from a steel alloy or a cast iron alloy, for example from the pearlitic material Mk82A. In particular, the inner surface is also rotationally symmetrical to the middle axis. The inner surface can therefore comprise a circular cylindrical geometry. However, the inner surface can also comprise a shape that deviates from a circular geometry. For example, the inner surface can be oval or at least slightly oval in a cross-section perpendicular to the middle axis.

A cylinder liner bore runs through a center of the cylinder liner. The inner surface is part of the cylinder liner bore. The cylinder liner bore is rotationally symmetrical to the middle axis. The cylinder liner bore runs through the cylinder liner along its entire length. Facing away from the inner surface, the cylinder liner comprises a cylindrical outer surface on an outer side, which can also be rotationally symmetrical to the middle axis. The outer surface faces a cylinder bore of an engine block of the internal combustion engine.

The inner surface can be divided into any number of zones. Preferably, at least the first zone and the second zone are provided. By the fact that the first zone is "different" from the second zone, it is to be understood here in particular that the first zone and the second zone are not identical. In particular, the first zone and the second zone are placed on top of each other or next to each other when viewed along the middle axis. The terms "next to each other" or "on top of each other" can therefore be used interchangeably. The first zone is arranged adjacent to the second zone. In particular, the second zone is adjacent to the first zone.

The zones together form the inner surface in particular. The zones preferably comprise a cylindrical geometry and are each rotationally symmetrical to the middle axis. The zones can therefore be circular in a cross-section perpendicular to the middle axis. However, a shape deviating from a circular geometry, for example oval, is also possible. A third zone may also be provided, with the second zone preferably being arranged between the first zone and the third zone.

The cylinder liner can be assigned a coordinate system with a width direction or x-direction, a height direction or y-direction and a depth direction or z-direction. The y-direction can also be referred to as the axial direction. The terms "y-direction" and "axial direction" can therefore be used interchangeably. The directions are oriented perpendicular to each other. In particular, the middle axis coincides with the y-direction or the axial direction or is oriented parallel to it. The middle axis can also be referred to as the axis of symmetry. The first zone and the second zone are arranged next to each other or on top of each other, particularly when viewed along the height direction or the axial direction. A radial direction is also assigned to the cylinder liner. The radial direction is oriented perpendicular to the middle axis and points away from it outwards in the direction of the inner surface or in the direction of the zones.

The reduced peak height Rpk, the core roughness depth Rk and the reduced groove depth Rvk can also be generally referred to as surface parameters or roughness parameters, which are defined in ISO 13565. The reduced peak height Rpk characterizes those material peaks of the respective zone that break off or are removed as the first contact region in the running-in process of the cylinder liner, depending on the material used for the cylinder liner. The core roughness depth Rk, on the other hand, characterizes the so-called working area.

The reduced groove depth Rvk, on the other hand, characterizes the lubricant binding. In other words, the ability or property to store the lubricant. Advantageously, the lubricant binding in the first zone is greater than the lubricant binding in the second zone. This can be achieved by the previously mentioned different values for the reduced groove depth Rvk in the first zone and the second zone. In particular, micro-reservoirs can be realized on the inner surface with the help of the different zones, which comprise different lubricant storage properties.

The cylinder liner can be a wet cylinder liner and is therefore also referred to as such. In this case, cooling water is fed to the cylinder liner with the aid of cooling canals provided in the engine block, which partially flows around its outer surface in order to dissipate heat from the cylinder liner. In this case, the cylinder liner can be replaced. However, the cylinder liner can also be a dry cylinder liner and is therefore also referred to as such. In this case, heat is dissipated to the engine block via heat conduction. In this case, the cylinder liner is also replaceable. Furthermore, the cylinder liner can also be a cast-in cylinder liner and is therefore also referred to as such. In the latter case, the cylinder liner cannot be separated from the engine block in a non-destructive manner.

According to one embodiment, the first zone comprises a smallest material ratio Mr1 of less than 10% and a biggest material ratio Mr2 of 60 to 75%, wherein the second zone comprises a smallest material ratio of less than 10% and a biggest material ratio Mr2 of 60 to 90%.

The "material ratio Mr" is generally understood here to mean, in particular, the percentage of a contact surface in relation to a total surface under consideration. The material ratio Mr is also defined in ISO 13565.

According to another embodiment, the inner surface comprises a third zone which differs from the first zone and the second zone, and which runs around the middle axis, wherein the third zone comprises a reduced peak height Rpk of less than 0.1 μm, a core roughness depth Rk of 0.05 to 0.2 μm and a reduced groove depth Rvk of 0.5 to 1.5 μm.

In particular, the third zone is also rotationally symmetrical to the middle axis. The first zone, the second zone and the third zone together form the inner surface. Thus, the inner surface is divided into the first zone, the second zone and the third zone. By the fact that the third zone "differs" from the first zone and the second zone, it is to be understood here in particular that the third zone does not correspond to the first zone and/or the second zone. In particular, the third zone can be arranged next to or below the second zone. The third zone may be adjacent to the second zone. This means in particular that the third zone is arranged adjacent to the second zone.

According to another embodiment, the third zone comprises a smallest material ratio Mr1 of less than 10% and a biggest material ratio Mr2 of 65 to 90%.

Thus, the smallest material ratio Mr1 of the third zone coincides with the smallest material ratio Mr1 of the first zone and the smallest material ratio Mr1 of the second zone. However, the first zone, the second zone and/or the third zone preferably differ from one another in the percentage range of their biggest material ratio Mr2.

According to another embodiment, the second zone is arranged between the first zone and the third zone when viewed along the middle axis.

In particular, this means that the first zone is arranged above the second zone when viewed along the height direction or the axial direction, with the third zone being arranged below the second zone. Accordingly, the second zone is positioned above the third zone.

According to another embodiment, the first zone is assigned to a top dead point of a piston which can be accommodated in the cylinder liner, wherein the third zone is assigned to a bottom dead point of the piston.

In an internal combustion engine, a "dead point" is a position of an internal combustion engine crankshaft in which the piston no longer moves in an axial direction, i.e. along the middle axis. The top dead point is located above the bottom dead point with respect to the height direction or axial direction.

According to another embodiment, a ratio of a first height of the first zone to a total height of the inner surface is 0.02 to 0.065, in particular 0.04.

For example, the first height can be 9 mm and the total height can be 247 mm. However, these values are to be understood as examples. The first height and the total height are measured along the height direction or axial direction. In this case, both the first height and the total height can be measured starting from a shoulder provided between a basic section and a collar section of the cylinder liner in a negative height direction starting downwards from the shoulder.

According to another embodiment, a ratio of a second height of the second zone to the total height is 0.06 to 0.1, in particular 0.08.

In particular, the second height is measured downwards from the first height along the negative height direction. For example, the second height is 20 mm.

According to another embodiment, a ratio of a third height of the third zone to the total height is 0.7 to 0.9, in particular 0.9.

For example, the third height can be 218 mm. The third height is measured from the second height downwards in a negative direction. The sum of the first height, the second height and the third height is the total height of the inner surface.

According to another embodiment, a ratio of the first height to the second height is 0.25 to 0.75, in particular 0.45.

In principle, the ratio of the first height to the second height can be chosen at will. In particular, however, the second height is preferably greater than the first height.

According to another embodiment, a ratio of the first height to the third height is 0.02 to 0.08, in particular 0.04.

The third height can be a multiple of the first height.

According to another embodiment, a ratio of the second height to the third height is 0.07 to 0.11, in particular 0.09.

In particular, the third height is greater than the second height. The third height can be a multiple of the second height.

According to another embodiment, the inner surface is machined using a honing process, wherein a hone angle is 30 to 60°, in particular 45°.

For example, the hone angle is identical in all zones. However, the zones can also comprise different hone angles. In such a honing process, for example, a honing awl is moved up and down along the middle axis and rotated around the middle axis. This results in a surface structuring of the inner surface or the different zones that is characteristic of honing. In particular, the so-called mirror honing can be used as a honing process.

According to another embodiment, the cylinder liner comprises a basic section, on which the inner surface is provided, and a collar section, wherein a shoulder is provided between the basic section and the collar section, and wherein the first zone is adjacent to the shoulder.

The first zone thus ends in particular at the shoulder. In particular, the first height of the first zone is dimensioned downwards in a negative height direction starting from the shoulder. The basic section is preferably tubular and rotationally symmetrical to the middle axis. The collar section is preferably ring-shaped and also rotationally symmetrical to the middle axis. The collar section preferably comprises a larger outer diameter than the basic section. With the help of the collar section, the cylinder liner can be positioned in a suitably shaped cylinder bore of the aforementioned engine block of the internal combustion engine. A fire ring can rest against the shoulder. The fire ring is a component that is separate from the cylinder liner and can be accommodated in the collar section. The cylinder liner is in particular an integral, preferably a one-piece material component. "Integral" or "one-piece" means that the cylinder liner is not composed of different subcomponents but forms a single component comprising the basic section and the collar section. "One-piece material" means that the cylinder liner is made from the same material throughout, for example a steel alloy.

Furthermore, an internal combustion engine comprising at least one such cylinder liner and a piston which is guided on the inner surface during operation of the internal combustion engine is proposed.

The internal combustion engine can be a diesel engine or a gasoline engine. The internal combustion engine comprises an engine block as mentioned above, in which several cylinder bores are provided. The number of cylinder bores corresponds to the number of pistons. For example, the internal combustion engine may comprise three, four, six or more than six cylinder bores and pistons. Each cylinder bore is assigned a cylinder liner as mentioned above, which is accommodated in the corresponding cylinder bore. Each cylinder liner is in turn assigned a piston, which runs in the cylinder liner assigned to it. The internal combustion engine can be part of a vehicle, in particular a truck or passenger car. The vehicle can be powered purely by the internal combustion engine. However, the vehicle can also be a hybrid vehicle. In this case, the vehicle comprises at least one electric motor in addition to the internal combustion engine.

The embodiments and features described for the proposed cylinder liner apply accordingly to the proposed internal combustion engine and vice versa.

Further possible implementations of the cylinder liner and/or the internal combustion engine also include combinations of features or embodiments described above or below with regard to the embodiment examples that are not explicitly mentioned. In this context, the person skilled in the art will also add individual aspects as improvements or additions to the respective basic form of the cylinder liner and/or the internal combustion engine.

Further advantageous embodiments and aspects of the cylinder liner and/or the internal combustion engine are the subject of the subclaims and of the embodiments of the cylinder liner and/or the internal combustion engine described below. In the following, the cylinder liner and/or the internal combustion engine are explained in more detail with reference to the enclosed figures.

DETAILED DESCRIPTION

In the figures, identical or functionally identical elements have been given the same reference symbols, unless otherwise stated.

Figure 1:
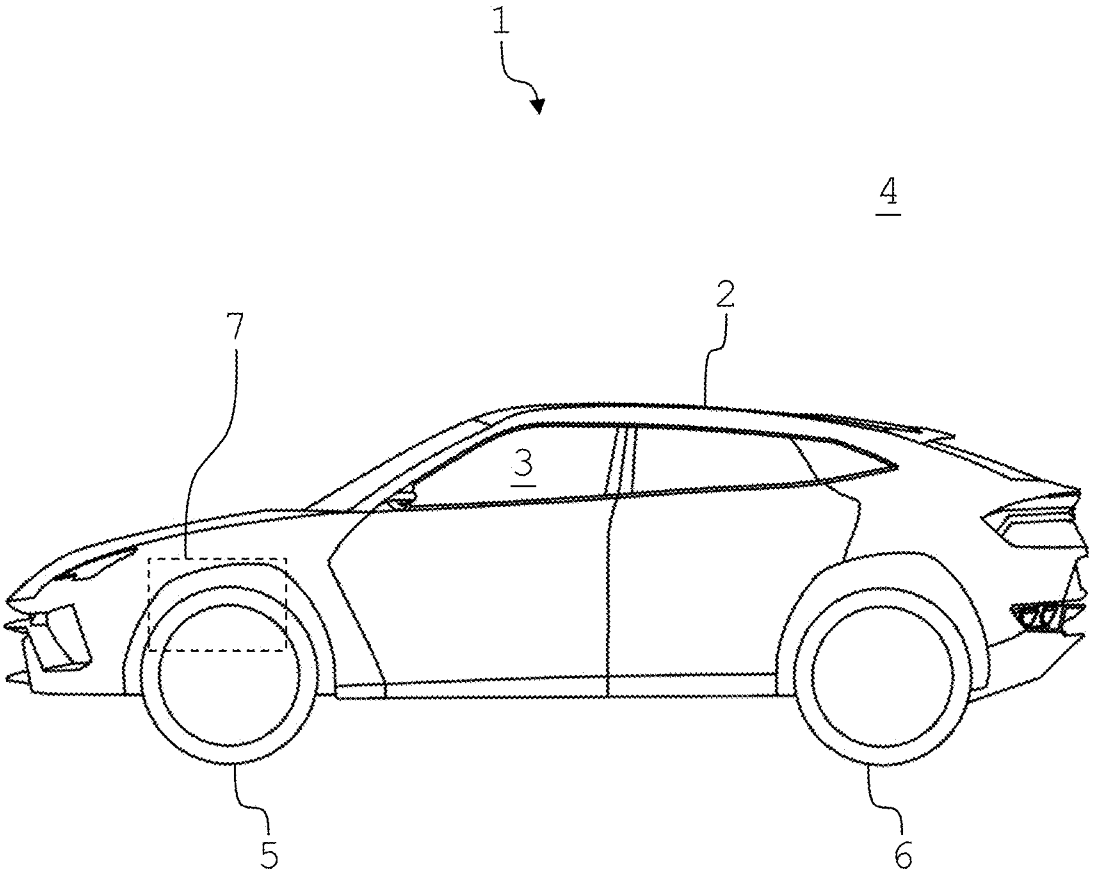
FIG. 1 shows a schematic side view of one embodiment of a vehicle.

FIG. 1 shows a schematic side view of an embodiment of a vehicle 1. The vehicle 1 is a motor vehicle, in particular a passenger car. The vehicle 1 can also be a commercial vehicle, for example a truck, a harvesting machine or a construction machine. Furthermore, the vehicle 1 can also be a military vehicle. In addition, the vehicle 1 can also be an aircraft, a watercraft or a rail vehicle. In the following, however, it is assumed that the vehicle 1 is a motor vehicle, in particular a passenger car.

The vehicle 1 comprises a car body 2 which encloses a passenger compartment or vehicle interior 3 of the vehicle 1. The vehicle interior 3 can accommodate a driver and passengers. The car body 2 delimits a surroundings 4 of the vehicle 1 from the vehicle interior 3. The vehicle interior 3 is accessible from the surroundings 4 by means of doors.

The vehicle 1 comprises a chassis with several wheels 5, 6. The number of wheels 5, 6 is basically arbitrary. Preferably, the vehicle 1 comprises four wheels 5, 6. However, the vehicle 1 may, for example, comprise six wheels 5, 6. The wheels 5, 6 are part of a chassis of the vehicle 1. Only two wheels 5, 6 can be driven. However, all wheels 5, 6 can also be driven. In this case, the vehicle 1 is a four-wheel drive vehicle.

The vehicle 1 comprises a combustion motor or internal combustion engine 7. The internal combustion engine 7 can be a diesel engine or a gasoline engine. The vehicle 1 can be powered purely by the internal combustion engine 7. However, the vehicle 1 can also be a hybrid vehicle. In this case, the vehicle 1 comprises at least one electric motor in addition to the internal combustion engine 7. The internal combustion engine 7 comprises an engine block and a plurality of pistons accommodated in piston bores in the engine block. A cylinder liner, in which the respective piston runs, can be accommodated in each piston bore. For example, the internal combustion engine 7 can comprise three, four, five, six or more than six pistons.

Figure 2:
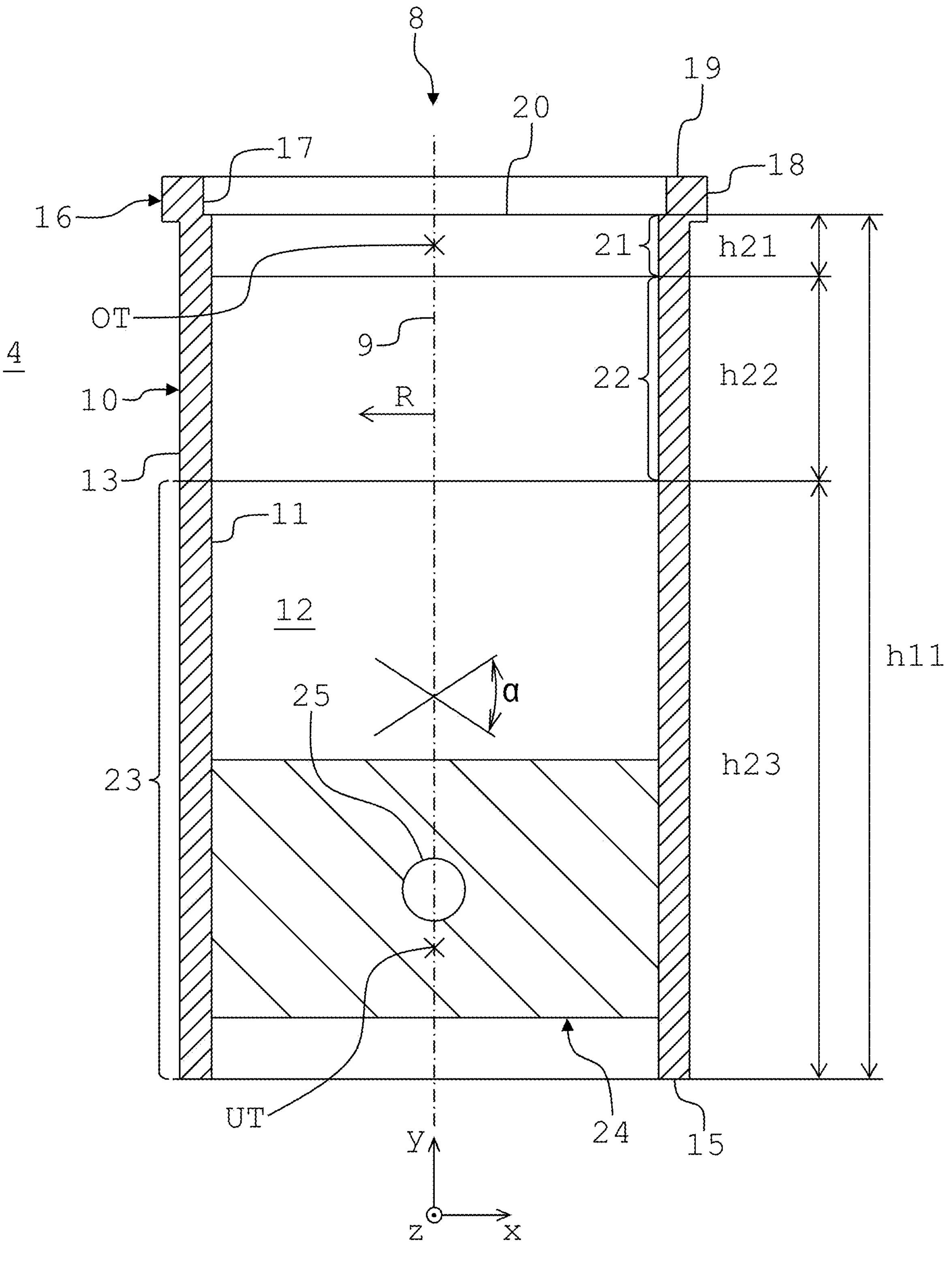
FIG. 2 shows a schematic sectional view of one embodiment of a cylinder liner for the vehicle according to FIG. 1.

FIG. 2 shows a schematic sectional view of one embodiment of a cylinder liner 8 as mentioned above. The cylinder liner 8 comprises an axis of symmetry or middle axis 9, to which the cylinder liner 8 is rotationally symmetrical. A coordinate system with a width direction or x-direction x, a height direction or y-direction y and a depth direction or z-direction z is assigned to the cylinder liner 8. The y-direction y can also be referred to as the axial direction. The terms "y-direction" and "axial direction" can therefore be used interchangeably. The directions x, y, z are oriented perpendicular to each other. In particular, the middle axis 9 coincides with the y-direction y or is oriented parallel to it. A radial direction R is also assigned to the cylinder liner 8. The radial direction R is oriented perpendicular to the middle axis 9 and points away from it.

The cylinder liner 8 is tubular and comprises a basic section 10 comprising a cylindrical inner side or inner surface 11 facing an interior or cylinder liner bore 12 of the cylinder liner 8, and an outer side or outer surface 13 facing a surroundings 14 of the cylinder liner 8. Accordingly, the inner surface 11 is provided on an inner side of the basic section 10, whereas the outer surface 13 is provided on an outer side of the basic section 10. The outer surface 13 can be cylindrical.

However, the outer surface 13 can also comprise shoulders and/or bevels. Both the inner surface 11 and the outer surface 13 are rotationally symmetrical to the middle axis 9. A front side or front surface 15 of the basic section 10 is provided on a bottom side of the basic section 10 in the orientation shown in FIG. 2. The front surface 15 runs completely around the middle axis 9.

In the orientation of FIG. 2 on the upper side, an annular collar section 16 adjoins the basic section 10. The collar section 16 is rotationally symmetrical to the middle axis 9. The collar section 16 comprises an inner side or inner surface 17 facing the cylinder liner bore 12 and an outer side or outer surface 18 facing the surroundings 14.

The inner surfaces 11, 17 delimit or form the cylinder liner bore 12 or are part of the cylinder liner bore 12. In the orientation of FIG. 2, the collar section 16 comprises a front side or front surface 19 on the upper side. The front surfaces 15, 19 are positioned parallel to each other and at a distance from each other.

The inner surface 17 and the outer surface 18 are each rotationally symmetrical to the middle axis 9. The outer surface 18 is offset outwards with respect to the outer surface 13 when viewed along the radial direction R. Accordingly, the inner surface 17 is also arranged offset outwards with respect to the inner surface 11 when viewed along the radial direction R.

Accordingly, the inner surface 17 and the outer surface 18 each comprise a larger diameter compared to the inner surface 11 and the outer surface 13. Between the basic section 10 and the collar section 16, a shoulder 20 is provided which is rotationally symmetrical to the middle axis 9. At the shoulder 20, the basic section 10 merges into the collar section 16.

A fire ring, which is not shown, rests against the shoulder 20 and can be accommodated in the cylinder liner bore 12. In the event that no fire ring is provided, the inner surfaces 11, 17 comprise the same diameter. In this case, the shoulder 20 is not provided. In the following, however, it is assumed that a fire ring is provided. This means that the shoulder 20 is also present.

The cylinder liner 8 is an integral component, in particular a one-piece material component. "Integral" or "one-piece" means in this case that the cylinder liner 8 is not composed of different subcomponents but forms a single component comprising the basic section 10 and the collar section 16. "One-piece material" means that the cylinder liner 8 is made of the same material throughout. Suitable materials for the cylinder liner 8 are steel alloys or cast iron alloys, for example the pearlitic material Mk82A. However, the cylinder liner 8 can also comprise other materials.

The cylinder liner 8 can be a wet cylinder liner and is therefore also referred to as such. In this case, cooling water is fed to the cylinder liner 8 with the aid of cooling canals provided in the engine block of the internal combustion engine 7, which partially flows around the outer surface 13 in order to dissipate heat from the cylinder liner 8. In this case, the cylinder liner 8 is replaceable.

However, the cylinder liner 8 can also be a dry cylinder liner and is therefore also referred to as such. In this case, heat is dissipated to the engine block via heat conduction. In this case, the cylinder liner 8 is also replaceable. Furthermore, the cylinder liner 8 can also be a cast-in cylinder liner and is therefore also referred to as such. In the latter case, the cylinder liner 8 cannot be separated from the engine block in a non-destructive manner.

The piston, which moves back and forth along the y-direction y and against the y-direction y during operation of the internal combustion engine 7, is guided on the inner surface 11. The inner surface 11 can be re-drilled and finely machined by honing after installation or, in the event that the cylinder liner 8 is a wet cylinder liner, before installation in the engine block. In this way, a required geometric shape and surface roughness can be ensured in order to fulfill the required tribological properties.

In this respect, the inner surface 11 should neither be too rough, which may cause excessive wear of the piston, nor too smooth, which may result in an insufficient lubricating film remaining between the inner surface 11 and the piston. Ideally, the inner surface 11 comprises micro-reservoirs for an engine oil or lubricating oil of the internal combustion engine 7, which can be achieved by a suitable porosity or certain honing patterns.

As previously mentioned, the inner surface 11 is machined using a honing process, in particular by means of mirror honing. In the present case, "honing" means a fine machining process. For example, a so-called honing tool is used, which rotates around the middle axis 9 and is simultaneously moved back and forth along and against the y-direction y. The aim of this machining process is to improve the dimensional and shape accuracy as well as the surface treatment, which supplies improved tribological properties. Honing is a type of machining with a geometrically undefined cutting edge. A hone angle $\alpha$ is 45°, for example.

However, the inner surface 11 does not comprise a constant surface roughness when viewed along the middle axis 9 or the y-direction y, but comprises different zones 21, 22, 23, which each comprise different surface roughnesses. The number of zones 21, 22, 23 is basically arbitrary. For example, three such zones 21, 22, 23 are provided. The zones 21, 22, 23 are arranged one above the other along the y-direction y or the middle axis 9.

A first zone 21, a second zone 22 and a third zone 23 are provided. The second zone 22 is placed between the first zone 21 and the third zone 23 when viewed along the middle axis 9. In the orientation of FIG. 2, the second zone 22 is placed above the third zone 23 and the first zone 21 is placed above the second zone 22. The zones 21, 22, 23 together form the inner surface 11 of the basic section 10. The first zone 21 ends at the shoulder 20. In the event that no fire ring is provided, the first zone 21 runs into the collar section 16. This means that the inner surface 17, which in this case comprises the same diameter as the inner surface 11, can be part of the first zone 21.

Each zone 21, 22, 23 is assigned a height h21, h22, h23. A sum of the heights h21, h22, h23 forms a total height h11 of the inner surface 11. A first height h21 is assigned to the first zone 21, a second height h22 is assigned to the second zone 22 and a third height h23 is assigned to the third zone 23. The heights h21, h22, h23 preferably differ from one another, as will be explained below. The zones 21, 22, 23 preferably all comprise the same hone angle $\alpha$. However, the zones can also comprise different hone angles $\alpha$.

Starting from the shoulder 20, the first height h21 and the total height h11 are dimensioned downwards in the opposite direction to the y-direction y, i.e. in the negative y-direction y. However, the dimensioning can also be carried out downwards from the front surface 19 in the negative y-direction y, especially if the shoulder 20 is not provided. The second height h22 is dimensioned starting from the first height h21 in the negative y-direction y downwards and the third height h23 is dimensioned starting from the second height h22 in the negative y-direction y downwards.

The first zone 21 is assigned to a top dead point OT of a piston 24 running in the cylinder liner 8. The third zone 23 is assigned to a bottom dead point UT of the piston 24. As previously mentioned, the zones 21, 22, 23 comprise different surface roughnesses. This makes it possible to create different micro-reservoirs for the lubricating oil in the different zones 21, 22, 23 on the inner surface 11.

The surface roughnesses of zones 21, 22, 23 are designated below in accordance with ISO 13565. The first zone 21 comprises a reduced peak height Rpk of less than 0.2 μm, a core roughness depth Rk of 0.05 to 0.35 μm, a reduced groove depth Rvk of 1.5 to 2.5 μm, a smallest material ratio Mr1 of less than 10% and a biggest material ratio Mr2 of 60 to 75%.

The second zone 22 comprises a reduced peak height Rpk of less than 0.2 μm, a core roughness depth Rk of 0.05 to 0.35 μm, a reduced groove depth Rvk of 0.5 to 2.5 μm, a smallest material ratio Mr1 of less than 10% and a biggest material ratio Mr2 of 60 to 90%.

The third zone 23 comprises a reduced peak height Rpk of less than 0.1 μm, a core roughness depth Rk of 0.05 to 0.2 μm, a reduced groove depth Rvk of 0.5 to 1.5 μm, a smallest material ratio Mr1 of less than 10% and a biggest material ratio Mr2 of 65 to 90%. This can be tabulated as follows:

| | Zone 21 | Zone 22 | Zone 23 |
|---|---|---|---|
| Rpk | <0.2 μm | <0.2 μm | <0.1 μm |
| Rk | 0.05 to 0.35 μm | 0.05 to 0.35 μm | 0.05 to 0.2 μm |
| Rvk | 1.5 to 2.5 μm | 0.5 to 2.5 μm | 0.5 to 1.5 μm |
| Mr1 | <10% | <10% | <10% |
| Mr2 | 60 to 75% | 60 to 90% | 65 to 90% |

The reduced peak height Rpk characterizes those material peaks of the respective zones 21, 22, 23 that break off or are removed as the first contact region in the running-in process, depending on the material used for the cylinder liner 8. The core roughness depth Rk characterizes the so-called working area. The reduced groove depth Rvk characterizes the lubricant bonding.

As previously mentioned, the heights h21, h22, h33 are of different sizes. For example, the first height h21 is 9 mm. The second height h22 can be 20 mm. The third height h23 can be 218 mm. This results in an exemplary ratio of the heights h21, h22, h23 to each other as follows:

$$h21:h22:h23 = 9:20:218 \approx 1:2.2:24.2$$

However, any other ratios of the heights h21, h22, h23 to each other can be selected. In this case, the total height h11 is 247 mm. This results in the following exemplary ratios of the heights h11, h21, h22, h23 to each other:

$$h21:h11 = 9:247 \approx 0.04$$

$$h22:h11 = 20:247 \approx 0.08$$

$$h23:h11 = 218:247 \approx 0.9$$

However, any other ratios of the heights h11, h21, h22, h23 to each other can also be selected.

The heights h21, h22, h23 of the zones 21, 22, 23 can also be set in relation to each other:

$$h21:h22 = 9:20 = 0.45$$

$$h21:h23 = 9:218 \approx 0.04$$

$$h22:h23 = 20:218 \approx 0.09$$

However, the above-mentioned ratios of the heights h21, h22, h23 to each other are purely exemplary. Deviations upwards and downwards are possible.

As previously mentioned, the cylinder liner 8 is associated with the piston 24, which is shown in a highly schematized form in FIG. 2. During operation of the internal combustion engine 7, the piston 24 runs back and forth along the middle axis 9 in the cylinder liner 8 between its top dead point OT and its bottom dead point UT. In doing so, the piston 24 is guided on the inner surface 11.

The different roughness parameters of the zones 21, 22, 23 ensure that sufficient lubrication of the piston 24 in the cylinder liner 8 is always guaranteed by the formation of micro-reservoirs in the inner surface 11.

The piston 24 comprises a piston eye 25. The piston eye 25 is a bore which passes through the piston 24 and is oriented perpendicular to the middle axis 9. A piston pin is accommodated in the piston eye 25, by means of which the piston 24 is operatively connected to a crankshaft of the internal combustion engine 7 via a connecting rod.

Although the present invention has been described with reference to examples of embodiments, it can be modified in many ways.

LIST OF REFERENCE SIGNS

1 Vehicle
2 Vehicle body
3 Vehicle interior
4 Surroundings
5 Wheel
6 Wheel
7 Internal combustion engine
8 Cylinder liner
9 Middle axis
10 Basic section
11 Inner surface
12 Cylinder liner bore
13 Outer surface
14 Surroundings
15 Front surface
16 Collar section
17 Inner surface
18 Outer surface
19 Front surface
20 Shoulder
21 Zone
22 Zone
23 Zone
24 Piston
25 Piston eye
h11 Height/total height
h21 Height
h22 Height
h23 Height OT Top dead point
R Radial direction
UT Bottom dead point
X x-direction
y y-direction
Z z-direction
α Hone angle

The invention claimed is:

1. A cylinder liner for use in an internal combustion engine, the cylinder liner comprising:

a middle axis, and an inner surface running around the middle axis, wherein the inner surface comprises a first zone, which runs around the middle axis, and a second zone which runs around the middle axis, wherein the first zone and the second zone are arranged next to each other when viewed along the middle axis, wherein the first zone comprises a reduced peak height Rpk of less than 0.2 μm, a core roughness depth Rk of 0.05 to 0.35 μm and a reduced groove depth Rvk of 1.5 to 2.5 μm, and wherein in the second zone the reduced peak height Rpk is less than 0.2 μm, the core roughness depth Rk is 0.05 to 0.35 μm and the reduced groove depth Rvk is 0.5 to 2.5 μm, wherein the first zone comprises a smallest material ratio Mr1 of less than 10% and a biggest material ratio Mr2 of 60 to 75%, wherein in the second zone the smallest material ratio Mr1 is less than 10% and the biggest material ratio Mr2 is 60 to 90%, wherein the inner surface further comprises a third zone which runs around the middle axis, wherein in the third zone the reduced peak height Rpk is less than 0.1 μm, the core roughness depth Rk is 0.05 to 0.2 μm and the reduced groove depth Rvk is 0.5 to 1.5 μm, wherein the second zone is arranged between the first zone and the third zone when viewed along the middle axis, wherein the cylinder liner is configured to receive a piston having a top dead point (OT) and a bottom dead point (UT) relative to the cylinder liner, wherein the first zone is positioned to include the top dead point (OT) and the third zone is positioned to include the bottom dead point (UT), wherein a ratio of a first height of the first zone to a total height of the inner surface of the cylinder liner is 0.02 to 0.065, wherein a ratio of a second height of the second zone to the total height of the cylinder liner is 0.06 to 0.1, wherein a ratio of a third height of the third zone to the total height of the cylinder liner is 0.7 to 0.9.

2. The cylinder liner according to claim 1, wherein in the third zone the smallest material ratio Mr1 is less than 10% and a biggest material ratio Mr2 is 65 to 90%.

3. The cylinder liner according to claim 1, wherein a ratio of the first height of the first zone to the second height of the second zone is 0.25 to 0.75.

4. The cylinder liner according to claim 1, wherein a ratio of the first height of the first zone to the third height of the third zone is 0.02 to 0.08.

5. The cylinder liner according to claim 1, wherein a ratio of the second height of the second zone to the third height of the third zone is 0.07 to 0.11.

6. The cylinder liner according to claim 1, wherein the inner surface of the cylinder liner is machined by a honing process, wherein a hone angle is 30 to 60°.

7. The cylinder liner according to claim 1, wherein the cylinder liner further comprises:

a basic section having the inner surface, and a collar section adjoining the basic section and having an inner surface of the collar radially offset outwardly from the inner surface of the cylinder liner in a radial direction; and a shoulder defined by the basic section and the collar section, wherein the first zone is adjacent to the shoulder.

8. An internal combustion engine comprising at least one cylinder liner according to claim 1 configured to receive the piston which is guided on the inner surface of the cylinder liner during operation of the internal combustion engine.

9. The cylinder liner of claim 1, wherein the ratio of the first height of the first zone to the total height of the inner surface of the cylinder liner is 0.04, the ratio of the second height of the second zone to the total height of the inner surface of the cylinder liner is 0.08, and the ratio of the third height of the third zone to the total height of the inner surface of the cylinder liner is 0.9.

10. The cylinder liner of claim 1, wherein a ratio of the first height of the first zone to the second height of the second zone is 0.25 to 0.75;

a ratio of the first height of the first zone to the third height of the third zone is 0.02 to 0.08; and a ratio of the second height of the second zone to the third height of the third zone is 0.07 to 0.11.

11. A cylinder liner for use in an internal combustion engine, the cylinder liner comprising:

a middle axis, and an inner surface running around the middle axis, the inner surface comprising:

a first zone, which runs around the middle axis, wherein the first zone includes a reduced peak height Rpk of less than 0.2 μm, a core roughness depth Rk of 0.05 to 0.35 μm, and a reduced groove depth Rvk of 1.5 to 2.5 μm;

a second zone which runs around the middle axis, wherein the second zone includes a reduced peak height Rpk of less than 0.2 μm, a core roughness depth Rk of 0.05 to 0.35 μm and a reduced groove depth Rvk of 0.5 to 2.5 μm; and a third zone which runs around the middle axis, wherein the third zone includes a reduced peak height Rpk of less than 0.1 μm, a core roughness depth Rk of 0.05 to 0.2 μm, and a reduced groove depth Rvk of 0.5 to 1.5 μm, wherein the second zone is positioned between the first zone and the third zone when viewed along the middle axis, wherein the reduced groove depth Rvk of the first zone is greater than the reduced groove depth Rvk of the second zone, and the reduced groove depth Rvk of the second zone is greater than the reduced groove depth Rvk of the third zone.

12. The cylinder liner of claim 11, wherein the first zone includes a first height, the second zone includes a second height, and the third zone includes a third height, wherein the third height of the third zone is greater than the second height of the second zone, and the second height of the second zone is greater than the first height of the first zone.

13. The cylinder liner of claim 12, wherein a ratio of the first height of the first zone to the third height of the third zone is 0.02 to 0.08; and a ratio of the second height of the second zone to the third height of the third zone is 0.07 to 0.11.

* * * * *